Figure 1:
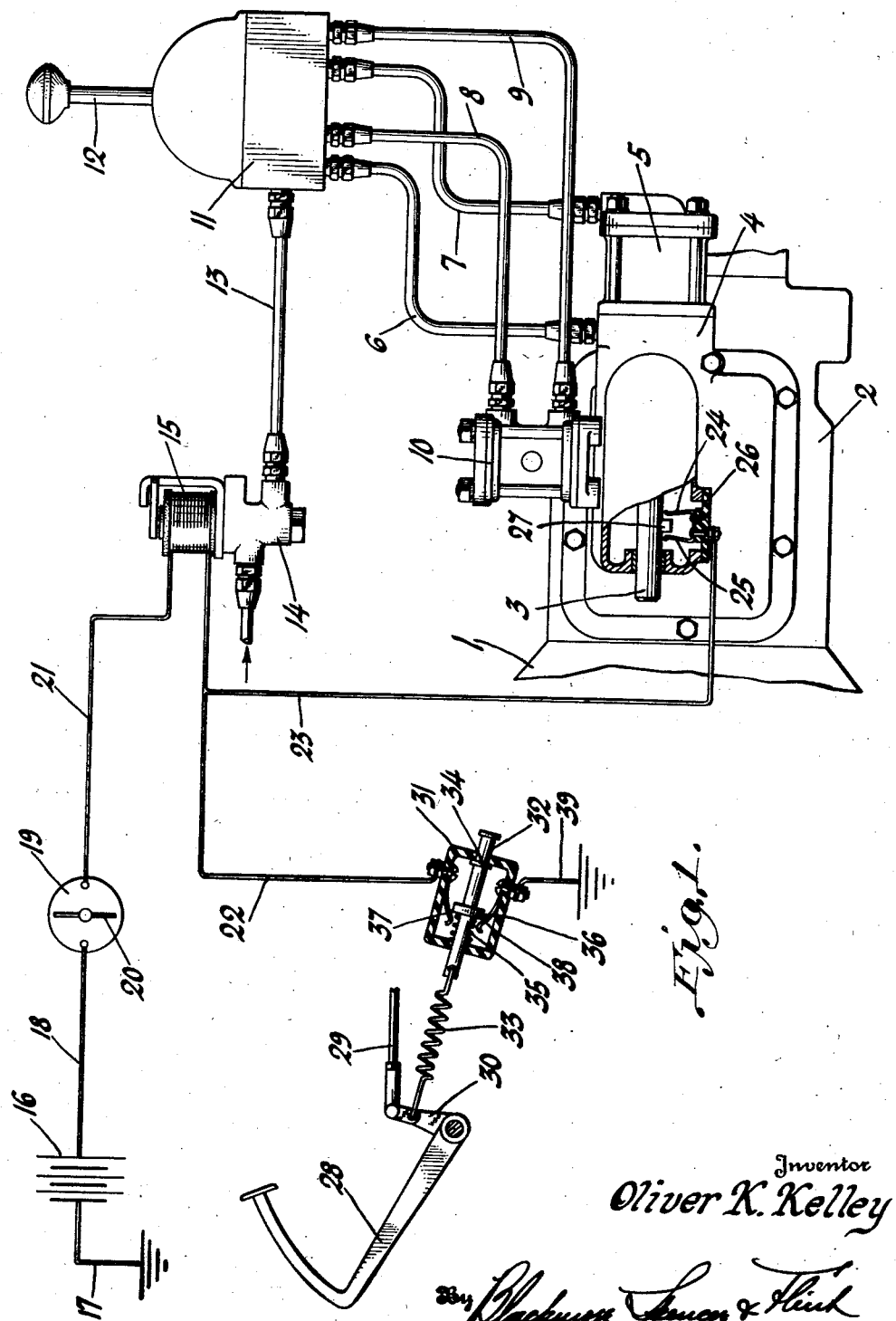

Feb. 23, 1937.  O. K. KELLEY  2,071,538
CLUTCH AND GEAR SHIFT INTERLOCK
Filed Aug. 2, 1935  2 Sheets-Sheet 1

Inventor
Oliver K. Kelley

Feb. 23, 1937.  O. K. KELLEY  2,071,538
CLUTCH AND GEAR SHIFT INTERLOCK
Filed Aug. 2, 1935   2 Sheets-Sheet 2

Inventor
Oliver K. Kelley
By Blackmore, Spencer & Flint
Attorneys

Patented Feb. 23, 1937

2,071,538

UNITED STATES PATENT OFFICE 2,071,538

CLUTCH AND GEAR SHIFT INTERLOCK

Oliver K. Kelley, Pontiac, Mich., assignor, by mesne assignments, to Yellow Truck and Coach Manufacturing Company, Pontiac, Mich., a corporation of Maine Application August 2, 1935, Serial No. 34,339

7 Claims. (Cl. 192—3.5)

This invention relates to the power transmission system of a motor vehicle and more particularly to an interlock between control devices to insure proper setting of parts for the transmission of power.

For effecting gear settings in a variable speed gear box there has been devised an air shifter system comprising which as disclosed in French Patent No. 781,511 comprises pressure operated devices to which compressed air is directed under the control of a manually manipulated multiple valve for selecting and bringing selected gear trains into drive relation. Because of the air flow lag there is a momentary time interval between the manual actuation of the master valve and the setting of the gears, particularly when the system is installed in large passenger coaches having the driver's station at the front of the vehicle and the power plant at the rear. If in this time interval and before the driving gears are fully set, the engine clutch is engaged, damage to the parts is likely to occur and this frequently happens due to the natural tendency for the driver to relieve foot pressure on the clutch pedal almost simultaneously with the completion of the setting of the master valve.

For example, reference is made to the application of a power shift system to a transmission in which speed synchronizing clutches are associated with the gearing to facilitate gear engagement. Here the trouble has been that the synchronizers burn out if the clutch is engaged before completion of synchronization. Inasmuch as the rotating gears can not be shifted into drive relation unless their speeds are equalized, engagement of the main clutch, before equalization, bars completion of the shift and the synchronizer cones remain in rubbing engagement, it being impossible for them to eliminate the speed difference and the cones burn out in consequence.

To necessitate the maintenance of the clutch fully disengaged until a selected gear setting is completed is the primary object of the present invention. To this end it is proposed to associate with the fluid pressure system a control valve in series with the master valve to cut off flow whenever the clutch is in position to transmit drive without the change speed gear being properly set in drive relation. An arrangement of this kind requires the vehicle operator to keep the clutch disengaged until the gear shifting operation is complete, for unless he does so air pressure is relieved and the gear mechanism returns to neutral position. Engagement of the clutch too soon does not, however, in the preferred embodiment of the invention, disturb the manual setting of the master valve and, therefore, without appreciable loss of time the gears may be brought into preselected setting by an immediate return by the operator of clutch disengagement.

As a safety precaution it is proposed additionally to interrelate the action of the flow control valve and the engine ignition system in a way that the flow is cut off when the ignition circuit is open. This insures return of the gear mechanism to neutral position when the operator turns off the ignition system to stop engine operation. With the gears in neutral they will remain so regardless of the setting of the master valve and so long as the clutch is engaged, when the engine operation is again started and thus the danger of starting the engine with the parts in power transmitting relation is eliminated.

Figure 2:
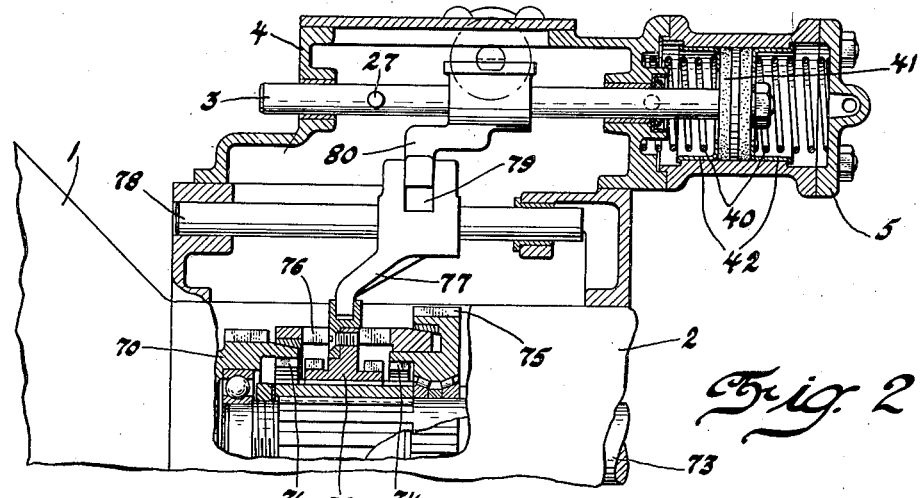
Figure 3:
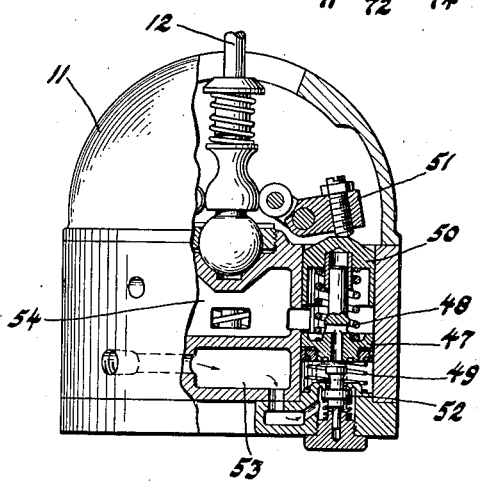
Figure 4:
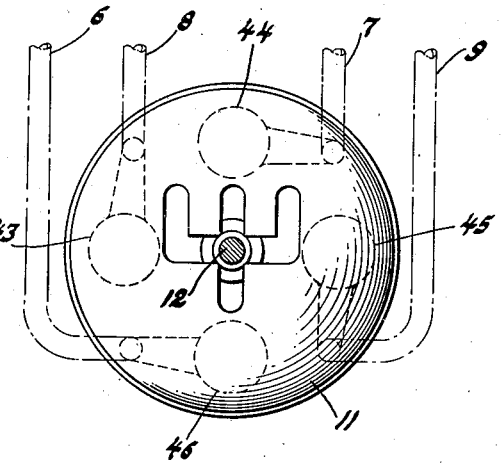
Figure 5:
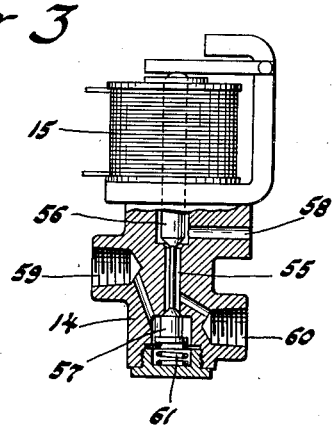

For a better understanding of the invention reference may be made to the accompanying drawings illustrating a preferred embodiment, wherein Figure 1 is a more or less diagrammatic layout showing the general arrangement of parts; Figure 2 is a sectional view of the shifter mechanism incorporated in the gear box; Figure 3 is an elevation, partly in section, of the hand controlled valve; Figure 4 is a top plan view of the hand valve, and Figure 5 is a detail view of the electrically actuated pressure control valve.

In the drawings the numeral 1 indicates a bell housing enclosing the clutch mechanism and 2 is the gear box for the change speed mechanism. For the sake of simplicity the engine which cooperates with the clutch and change speed transmission in affording the power plant, is not illustrated in the drawings nor is the drive to the road wheels, since the structure in this respect is purely conventional.

Also of conventional design is the synchromesh transmission employed in the organization here involved. It may include input and output shafts adapted to be driven through selected gear trains of the constant mesh type with speed synchronizing mechanism as shown in Figure 2. In this well known construction the gear 70 fixed on the input shaft for driving a countershaft carries internal clutch teeth 71 adapted to be engaged with the slidable clutch collar 72 keyed on the output shaft 73 for the direct or high speed setting. The second speed setting is effected by moving the collar 72 into engagement with the clutch teeth 74 on the gear 75 rotatably mounted on the output shaft 73 and driven through the countershaft. Each gear 70 and 75 is provided with conical clutching surfaces for engagement with cooperating synchronizing cones on a sleeve 76 carried by the collar 72. In the initial portion of the shifting movement of the clutch collar 72 the synchronizing clutches act to equalize speeds for the non-clashing engagement of the driving toothed clutches. Actuation of the shifter clutch collar 72 is through the agency of a shifter fork 77 fitted to an annular groove in the collar and carried by the shift rail 78. Additional shift rails placed side by side are provided for reverse and low speed setting and the head of each shifter fork is provided with a transverse groove as seen at 79 to receive the end of a selector arm 80 movable from one to the other when the several grooves 79 are in transverse alinement, as in the case when the parts are in the neutral setting. Any given speed setting is effected through the movement of the proper shift rail and the rails are selected and then shifted through the actuation of the lever arm 80 which is rigid with the rod 3, having a bearing in the housing 4 on one wall of the box 2. The rod 3, therefore, is both rockable about its axis and movable axially in its bearings. At one end of the housing 4 is secured a piston cylinder 5 having therein a piston connected to one end of the rod 3. Air under pressure may be introduced on either side of the piston through air pressure lines 6 and 7 to shift the rod axially and similar air pressure lines 8 and 9 are provided to supply air under pressure to opposite ends of a piston cylinder 10 in which is located a piston connected with the rail 3 to rock the same.

The structure of the two piston and cylinder assemblies may be identical and, therefore, only the cylinder 5 is shown in section. As seen in Figure 2 a pair of springs 40 are contained within the cylinder 5 on opposite sides of the piston 41 and tend to center the piston when air pressure on both sides is relieved. In order that the springs will not act in opposition to each other when the piston is moved from its centered position a pair of slidable sleeves 42 seat the springs on the piston and limit their expansion by engagement with shouldered abutments on the cylinder wall.

Where three shifter rails are provided in the transmission, the intermediate position of the piston within the cylinder 10 holds the actuating arm on the rod 3 in engagement with the central rail which may control the setting of the second and third speed gears, while the movement of the piston to one end of its stroke selects one side rail which may control the first speed gear setting and the movement of the piston to the other limit selects the other side rail which may control the reverse speed gear setting. Thus the conduit 9 may be termed the reverse speed selector conduit and the pressure line 8 may be termed the first speed selector conduit. Movement of the piston within the cylinder 5 to the right in the drawings may be employed to shift the central shift rail to effect second speed setting and, therefore, the pressure line 6 may be termed the second speed shifter conduit and the pressure line 7 may be termed the first, third and reverse speed shifter conduit inasmuch as the parts may be so arranged that the flow of air under pressure through this line will move the rod 3 toward the left in the drawings for actuating any of the three rails selected by the piston in the cylinder 10.

For controlling the flow of air through various combinations of the conduits there is used a multiple valve located within the tower 11 and controlled by a hand lever 12. The tower, of course, will be located adjacent the vehicle driver's seat and the several conduits may be any length necessary to reach the change speed box regardless of its position in the vehicle. Setting of the hand lever 12 to any predetermined position allows air to flow through the conduit 13 past the master valve into the conduits 6, 7, 8, and 9 in predetermined combinations.

For a better understanding of the multiple valve reference may be made to Figures 3 and 4 where the hand lever 12 is shown in neutral position. Its movement to effect air flow through the several pressure conduits is guided by slots in the upper wall of the valve casing and controls the action of valve assemblies contained within the tower at the positions indicated by the numerals 43, 44, 45, and 46. Each valve assembly includes a slidable piston 47 enclosed within a cylinder and floated between springs 48 and 49. The spring 48 transmits force from a plunger 50 when the plunger is depressed through the rocking of the bell lever 51 upon its engagement and movement with the hand lever 12. As the piston 47 is depressed against the spring 49 it engages the stem of a valve 52 first to close a port communicating opposite sides of the piston and then to move the valve 52 away from its seat. The valve 52 controls flow of air under pressure from the pressure chamber 53 which is common to all of the valves and to which the pressure conduit 13 is connected, the air under pressure moving into the space immediately below the piston 47 and from which it flows through whichever one of the conduits 6–9 is associated therewith as will be clear from the diagram in Figure 4. The space above the piston 47 communicates through an opening in the wall with an exhauster chamber 54 vented to atmosphere and common to the several valve assemblies. In the position of the parts as seen in Figure 3 the valve 52 is closed and the assembly, as well as its associated pressure line, is exhausted.

Considering the diagrammatic layout of Figure 4, the valve at 43 is opened when the shift lever 12 is moved toward the left; the valve at 45 is opened by a movement of the lever toward the right; the valve at 46 is opened by a lever movement toward the bottom of the sheet and the valve at 44 is opened by a movement of the lever toward the top of the sheet. Therefore, with the hand lever positioned in the upper left-hand slot, both valves 43 and 44 are opened and permit pressure flow through the conduits 8 and 7 for a low speed forward gear setting. When the hand lever is positioned in the lower slot only the valve 46 is opened for the flow through the conduit 6 to effect second speed gear setting. Third speed gear setting is had upon flow through the line 7 with the lever positioned in the middle slot of the upper group and for reverse speed gear setting the lever is moved into the right-hand upper slot to open both valves 45 and 44 for pressure flow through the conduits 9 and 7. Any conduit not in communication through its control valve with the pressure chamber 53 is open at atmosphere through the exhauster chamber 54.

The structure thus far described has been in use for sometime and affords a satisfactory gear shifting system so long as care is exercised in its use. However, the system is open to abuse by negligent or inexperienced vehicle operators and careless manipulation of the vehicle control devices has in many cases resulted in serious damage.

To prevent the shifting operation at improper times it is here proposed to modify the existing system in a very simple manner. This includes interposing between the pressure supply lines 13 and the source of air under pressure, an electrically operated valve 14 adapted to cut off the supply of pressure if the clutch is engaged when no set of gears in the transmission are in fully engaged relation.

In detail the valve body 14 is seen in Figure 5 as comprising a shouldered passage 55 having spaced conical seats with the valve members 56 and 57, respectively, forming a unitary fixed assembly with the movable solenoid plunger. The shouldered passage 55 communicates above the seat for the member 56 through a port 58 with atmosphere; below the seat for the member 57 with a threaded hollow boss 59 adapted for connection with the pressure supply source and intermediate the valve seats with a hollow threaded boss 60 adapted for connection with the conduit 13 leading to the hand controlled multiple valve assembly 11. In the illustrated position of the parts shown the valve 57 is seated under influence of the spring 61 and the line 13 is exhausted through the port 58. Depression of the solenoid plunger seats the valve 56 and opens the valve 57 for the flow of air under pressure through the conduit 13.

For actuating the valve there is provided a solenoid 15 contained within an electrical circuit which has a battery 16 or other source of current supply, grounded on one side as at 17. The other side of the battery may be connected through a cable 18 to a switch 19, preferably associated with the engine ignition lock and controlled by the engine ignition key 20, so that both circuits are opened or closed at the same time. Conduit 21 connects the switch 19 with the solenoid 15 from which lead a pair of parallel conduits 22 and 23, each containing a circuit closing switch of appropriate design. The switch associated with the conduit 23 may comprise a pair of spaced fingers 24 and 25 mounted on an insulator plate 26 and suitably connected with the conduit 23. The fingers 24 and 25 extend inwardly of the housing 4 and are adapted to be grounded through a contact lug 27 carried by the shifter rod 3. The spacing of the parts is so arranged that when the shift rod 3 is moved in either direction to bring selected gears into completely meshed relation one or the other of the contact fingers 25 will be engaged by the lug 27 and thus close the electrical circuit whereby current flowing through the solenoid 15 will maintain the valve 14 open to the source of pressure.

The solenoid is also energized when the conduit 22 is grounded and the grounding is dependent upon disengagement of the clutch contained within the housing 1 and which is controlled by a foot pedal 28 or other similar control member. The actuation of the foot pedal 28 is transmitted to the clutch in any suitable fashion and for the purpose of illustration there is shown a simple drag link 29 adapted to be connected at one end to the clutch throw-out lever and at its opposite end with an arm 30 fixed with the swinging lever 28. For convenience, the circuit closing switch which is dependent upon clutch engagement, may be associated with the foot pedal as is shown in the drawings. The drawings show the switch as comprising a housing 31 adapted to be fixed to a convenient part of the motor vehicle and having slidable therein a plunger 32 connected at one end by means of a spring 33 or the like with the lever arm 30. Shouldered portions 34 at the opposite end of the plunger may be provided as stops to limit the movement of the plunger and a light spring 35 interposed between one wall of the casing 31 and an enlargement 36 of the plunger serves to move the plunger when the clutch pedal is not depressed, to a position in which the collar 36 is out of engagement with the spring fingers 37 and 38, respectively. The contact finger 37 is electrically connected with the cable 22 and the finger 38 is grounded as at 39 and the bridging of the fingers by the collar 36 when the pedal is depressed, closes the circuit irrespective of the grounding of cable 23.

The drawings show the gear shifting mechanism in neutral position whereby the electric circuit by which the interlock is effected, is open. In order that the valve 14 may be actuated to permit the flow of fluid under pressure for effecting a drive relation in the change speed gear box, the engine ignition circuit must be closed by the usual ignition key and the engine clutch disengaged. These two operations which are customarily performed in any event, closes the switch 19 as well as the switch controlled by the clutch pedal 28, whereby the solenoid 15 is energized. The vehicle operator may then move the shift lever 12 to a selected speed setting and as soon as the gears are properly engaged the conductor 23 will be grounded to keep the solenoid energized after the foot pedal is released for engaging the clutch. The shifting operation is the same for any speed setting and essentially is no different from what is ordinarily required in the operation of any conventional vehicle.

Should the operator remove his foot from the pedal 28 prior to the completion of the shift neither of the parallel lines 22 and 23 will be grounded and the deenergization of the solenoid 15 closes the valve 14 to cut off the application of pressure and vent the system beyond the valve, whereby in the absence of fluid pressure the gear shifting mechanism returns under influence of the centralizing springs to neutral position. It is, therefore, useless to engage the clutch prior to completion of the shift. Such engagement does not disturb the setting of the master valve and as soon as the operator again depresses the clutch pedal the resumption of the shifting action immediately takes place. The operator quickly learns to time his actions to give the shifting mechanism a momentary interval before release of the clutch pedal.

Should the vehicle be driven to a stop and the ignition key 20 removed the solenoid is again deenergized to close the valve 14 and cause an immediate return of the parts to neutral position regardless of the setting of the shift lever 12. This will eliminate the danger of any transmission of power to the vehicle wheels when the engine is again started should the lever have been left in other than the neutral setting, inasmuch as the return of the gearing to neutral broke the ground connection of the conductor 23 and in order to reestablish the circuit it is necessary to close the line 22 by disengagement of the clutch before the gears will return to drive relationship under control of the master valve. It also insures open circuits and a saving of current waste when the vehicle is idle.

I claim:

1. In a motor vehicle, the combination with a clutch and a fluid pressure controlled change speed transmission, of a valve controlling fluid pressure suppy for said transmission, a solenoid associated with said valve for the actuation thereof, an electrical circuit containing said solenoid, a switch associated with the clutch to close the circuit whenever the clutch is disengaged and a second switch arranged in parallel with the first switch and associated with the transmission for closing said circuit whenever a speed setting is complete.

2. In a motor vehicle drive, a valve controlling the application of fluid pressure for effecting a speed setting, an actuating device for said valve, means for energizing said device when a speed setting is effected and other means for energizing said device during a speed setting operation.

3. The combination with a manually operated clutch and a fluid pressure operated speed changing mechanism, of a fluid pressure control valve, an actuating device therefor, means associated with the clutch to energize said device when the clutch is disengaged and other means associated with the speed changing mechanism for energizing said device when said mechanism has established a speed setting.

4. In a motor vehicle drive, a clutch, a power operated shifter for effecting and maintaining selected speed settings, means associated with said shifter to cut off the application of power thereto when the shifter is out of speed setting position and means associated with said clutch to cut off the application of power when the clutch is engaged, the mentioned means being arranged in parallel.

5. In the transmission of power, clutch mechanism, change speed gearing, fluid actuated gear setting mechanism, an electrically operated valve controlling the application of fluid to said gear setting mechanism, and an electric circuit containing said electrically operated valve and including a pair of circuit closing switches arranged in parallel, one thereof being associated with the gear setting mechanism and the other with the clutch mechanism for closing the circuit when said mechanisms are in preselected settings.

6. The combination with change speed gearing and clutch mechanisms, of an electrically operated device for actuating a valve which controls the application of fluid under pressure to effect gear changes, a circuit containing said device and including a pair of circuit closing switches arranged in parallel and associated respectively with said mechanisms, whereby the circuit is closed either when a gear setting is effected or the clutch disengaged.

7. In the control of power transmitting mechanism of motor vehicles having a clutch and change speed gearing, a clutch releasing device, a fluid shift system for the change speed gearing, an electrically actuated valve controlling fluid flow, an electric circuit containing said electrically actuated valve, a pair of circuit closing switches arranged in parallel in said circuit and associated respectively with said device and system, and a switch in series with the other switches and operable in conjunction with an engine ignition control device.

OLIVER K. KELLEY.